United States Patent
Wentink et al.

(10) Patent No.: US 9,807,796 B2
(45) Date of Patent: Oct. 31, 2017

(54) SYSTEMS AND METHODS FOR RESETTING A NETWORK STATION

(75) Inventors: Maarten Menzo Wentink, Breukelen (NL); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 13/597,710

(22) Filed: Aug. 29, 2012

(65) Prior Publication Data
US 2013/0223358 A1 Aug. 29, 2013

Related U.S. Application Data

(60) Provisional application No. 61/530,689, filed on Sep. 2, 2011.

(51) Int. Cl.
*H04W 28/04* (2009.01)
*H04W 74/04* (2009.01)
(Continued)

(52) U.S. Cl.
CPC ........ *H04W 74/04* (2013.01); *H04W 74/0816* (2013.01); *H04W 74/006* (2013.01)

(58) Field of Classification Search
CPC .............. H04W 74/04; H04W 74/006; H04W 74/0816; H04W 74/002; H04W 74/08; H04W 74/0866; H04W 28/04; H04W 28/12; H04W 4/06; H04W 48/16; H04W 88/04; H04W 88/08
(Continued)

(56) References Cited

U.S. PATENT DOCUMENTS 7,016,948 B1 * 3/2006 Yildiz .................. H04W 24/08
709/221
7,599,340 B2 10/2009 Chandra et al.
(Continued)

FOREIGN PATENT DOCUMENTS

CN 1640063 A 7/2005
JP 2009522910 A 6/2009
(Continued)

OTHER PUBLICATIONS

IEEE 802.11, IEEE Standard for Information technology—Telecommunications and information exchange between systems—Local and metropolitan area networks—Specific requirements; Part 11: Wireless LAN Medium Access Control (MAC) and Physical Layer (PHY), 2007.
(Continued)

*Primary Examiner* — Andrew Chriss
*Assistant Examiner* — Rasha Fayed
(74) *Attorney, Agent, or Firm* — Joseph Hanasz

(57) ABSTRACT

Systems and methods for communicating in a wireless communication system are described. One implementation is provided for effectively resetting stations within a wireless communication system. For example, a signal indicating the end of a contention free period may be transmitted from a device requesting the contention free period to another peer device or an access point. The peer device or access point may be configured to then transmit the occurrence of the end of the contention free period to other devices of the wireless communication system.

61 Claims, 8 Drawing Sheets

(51) Int. Cl.
*H04W 74/08* (2009.01)
*H04W 74/00* (2009.01)

(58) Field of Classification Search
USPC .......................................... 370/329, 338, 455
See application file for complete search history.

(56) References Cited

U.S. PATENT DOCUMENTS

| | | | |
|---|---|---|---|
| 7,609,674 B2 | 10/2009 | Kwon et al. | |
| 7,623,542 B2 | 11/2009 | Yonge, III | |
| 7,864,796 B1 | 1/2011 | Benveniste | |
| 7,940,688 B1 | 5/2011 | Benveniste | |
| 2002/0071449 A1* | 6/2002 | Ho | H04L 12/403 370/447 |
| 2003/0169763 A1* | 9/2003 | Choi | H04W 74/02 370/462 |
| 2004/0120292 A1* | 6/2004 | Trainin | H04L 1/188 370/338 |
| 2004/0196871 A1* | 10/2004 | Terry | H04W 28/06 370/477 |
| 2005/0135318 A1* | 6/2005 | Walton | H04L 12/66 370/338 |
| 2006/0029073 A1* | 2/2006 | Cervello | H04W 74/0816 370/389 |
| 2006/0114878 A1* | 6/2006 | Choe | H04W 74/02 370/346 |
| 2007/0115882 A1* | 5/2007 | Wentink | H04N 21/4126 370/329 |
| 2007/0160021 A1* | 7/2007 | Xhafa | H04W 74/04 370/338 |
| 2007/0171858 A1* | 7/2007 | Grandhi | H04W 74/002 370/328 |
| 2007/0217352 A1* | 9/2007 | Kwon | H04W 48/08 370/312 |
| 2007/0299571 A1* | 12/2007 | Laberteaux | G08G 1/096716 701/24 |
| 2008/0013496 A1* | 1/2008 | Dalmases | H04W 72/0446 370/336 |
| 2009/0052408 A1* | 2/2009 | Kwak | H04W 74/002 370/336 |
| 2009/0103501 A1* | 4/2009 | Farrag | H04W 74/02 370/337 |
| 2010/0135268 A1* | 6/2010 | Seok | H04W 74/0816 370/338 |
| 2011/0255442 A1 | 10/2011 | Wang et al. | |
| 2012/0327870 A1* | 12/2012 | Grandhi | H04W 28/06 370/329 |

FOREIGN PATENT DOCUMENTS

| | | |
|---|---|---|
| JP | 2009522930 A | 6/2009 |
| JP | 2009523371 A | 6/2009 |
| JP | 2011525773 A | 9/2011 |
| JP | 2015200369 A | 11/2015 |
| RU | 2273964 C2 | 4/2006 |
| WO | 2007078073 A1 | 7/2007 |
| WO | 2007082229 A2 | 7/2007 |

OTHER PUBLICATIONS

IEEE 802.11n-2009, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, Amendment 5: Enhancements for Higher Throughput (2009).
IEEE P802.11z/D7.0, Draft Standard for Information Technology—Telecommunications and information exchange between systems—Local and metropolitan area networks—Specfic requirements—Part 11: Wireless LAN Medium Access Control (MAC) and Physical Layer (PHY) specifications, Amendment 6: Extensions to Direct Link Setup (DLS) (2010).
Poojary et al., "Medium Access Control in a Network of Ad Hoc Mobile Nodes with Heterogeneous Power Capabilities", IEEE, pp. 872-877 (2001).
Wang et al., "Location- and Power-aware Protocols for Wireless Networks with Asymmetric Links", WSPC/Trim Size: 9in×6in for Review Volume, Chapter 1, pp. 1-35 ( Apr. 20, 2005).
International Search Report and Written Opinion—PCT/US2012/053414—ISA/EPO—Nov. 20, 2012.
Benveniste M, "Proposed 802.11 MAC Extensions for 11n/s/p," [online], IEEE 802.11-06/0632r1, IEEE, May 17, 2006, [searched on Aug. 30, 2016], URL, https://mentor.ieee.org/802.11/den/06/11-06-0632-01-0wng-proposed-multi-purpose-802-11-mac-extensions.ppt, 19 pages.

* cited by examiner

SYSTEMS AND METHODS FOR RESETTING A NETWORK STATION

CROSS-REFERENCE TO RELATED APPLICATIONS

The present application claims priority to U.S. Provisional Application No. 61/530,689 entitled "Systems and Methods for Resetting a Network Station," filed on Sep. 2, 2011, the entirety of which is incorporated by reference.

BACKGROUND

Field

The present application relates generally to wireless communication systems and more specifically to systems, methods, and devices for resetting stations within wireless communication systems.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

In some implementations, it may be desirable to provide an exclusive communication period for a device to transmit data. For example, when a device requests exclusive access to an access point, all other devices using the access point may be configured to pause transmitting information to allow the requesting device exclusive access. When the requesting device is finished transmitting, the device may transmit a signal indicating the end of the contention free period. However, not all devices within the basic service area of the access point may receive this signal. Accordingly, improved methods and systems for resetting all devices in a basic service area are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include accounting for the Doppler Effect in wireless communication systems.

In one aspect, a method of communicating in a wireless communication system is provided. The method includes receiving, from an access point, a first signal requesting a start of a contention free period for a first communication device. The method further includes transmitting a second signal indicating the start of the contention free period to a plurality of communication devices. The method also includes receiving, from the access point, a third signal indicating an end of a contention free period. The method also includes transmitting a fourth signal indicating the end of the contention free period to the plurality of communication devices.

In one aspect, another method of communicating in a wireless communication system is provided. The method includes transmitting, from an access point, a first signal requesting a start for a contention free period. The method also includes receiving a second signal indicating the start of the contention free period. The method further includes transmitting, from the access point, a third signal indicating an end of the contention free period. Moreover, the method includes receiving a fourth signal indicating the end of the contention free period.

In a further innovative aspect, a wireless communication device is provided. The device includes a processor configured to generate a first signal instructing a second wireless communication device to transmit a signal indicating the end of a contention free period. The device further includes a transmitter coupled with the processor and configured to transmit the first signal to the second wireless communication device.

In another innovative aspect, a further wireless communication device is provided. The device includes a receiver configured to receive a first signal from a second wireless communication device indicating an end of a contention free period. The device includes a processor coupled with the receiver and configured to generate a second signal indicating the end of the contention free period based at least in part on the first signal. The device also includes a transmitter coupled with the processor and configured to transmit the second signal to a plurality of wireless communication devices based at least in part on the first signal.

In one aspect, a non-transitory computer readable storage medium comprising instructions is provided. The instructions, when executed by a processor of a wireless communication apparatus, cause the apparatus to receive, from an access point, a first signal requesting a start for a contention free period for a first communication device. The instructions further cause the apparatus to transmit a second signal indicating the start of the contention free period to a plurality of communication devices. The instructions also cause the apparatus to receive, from the access point, a third signal indicating an end of the contention free period. The instructions also cause the apparatus to transmit a fourth signal indicating the end of the contention free period to the plurality of communication devices.

In a further aspect, a non-transitory computer readable storage medium comprising instructions is provided. The instructions, when executed by a processor of a wireless communication apparatus, cause the apparatus to transmit, from an access point, a first signal requesting a start for a contention free period. The instructions also cause the apparatus to receive a second signal indicating the start of the contention free period. The instructions further cause the apparatus to transmit, from the access point, a third signal indicating an end of the contention free period. The instructions also cause the apparatus to receive a fourth signal indicating the end of the contention free period.

A further innovative wireless communication device is provided. The device includes means for receiving, from an access point, a first signal requesting the start of a contention free period for a first communication device. The device includes means for transmitting a second signal indicating the start of the contention free period to a plurality of communication devices. The device also includes means for receiving, from the access point, a third signal indicating an end of the contention free period. The device further includes means for transmitting a fourth signal indicating the end of the contention free period to the plurality of communication devices.

Another innovative wireless communication device is provided. The device includes means for transmitting, from an access point, a first signal requesting the start of a contention free period. The device includes means for receiving a second signal indicating the start of the contention free period. The device also includes means for transmitting, from the access point, a third signal indicating an end of the contention free period. The device further includes means for receiving a fourth signal indicating the end of the contention free period.

Implementations of one or more of the above may further include transmitting the fourth second signal, a data signal, and a signal indicating the end of the contention free period during the contention free period requested by the first signal. The signal may be transmitted to the plurality of communication devices. Implementations may be configured to receive the third signal during the contention free period. Some implementations may be configured to transmit the second signal, a data signal, and the fourth signal during the contention free period. In some implementations, the first communication device may include a user equipment. In some implementations, the first communication device may be a peer to a user equipment. Signals, such as the first signal or the third signal, may be received at a user equipment. The fourth signal, in some implementations, may be transmitted from a user equipment.

In some implementations described, the third signal may include a signal identifier, a duration, a first value identifying a communication device transmitting the signal, a second value identifying a second communication device of the plurality of communication devices to receive the signal, and a signal checksum. In some implementations, the third signal may include including a signal identifier, a duration, a first value identifying one or more communication devices of the plurality of communication devices, a second value identifying a second communication device of the plurality of communication devices to receive the signal, a third value identifying one or more communication devices of the plurality of communication devices, and a signal checksum. At least one of the first value identifying the first communication device transmitting the signal and the second value identifying the second communication device of the plurality of communication devices may include a media access control address.

DETAILED DESCRIPTION

Figure 1:
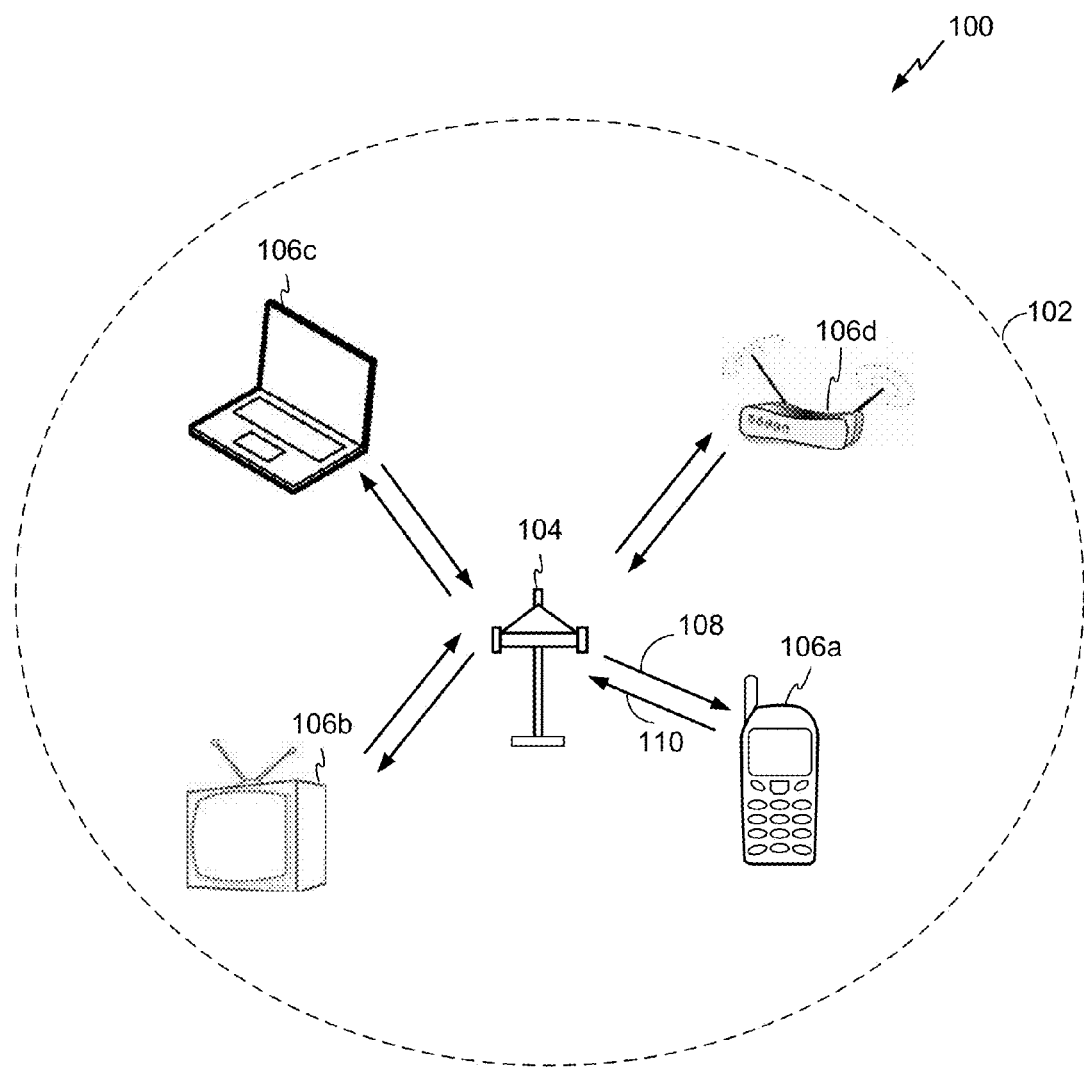
FIG. 1 shows an exemplary wireless communication system.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as wireless protocols. For example, the various aspects described herein may be used as part of the IEEE 802.11ah protocol, which uses sub-1 GHz bands.

In some aspects, wireless signals in a sub-gigahertz band may be transmitted, for example, according to the 802.11ah protocol. Transmission may use orthogonal frequency-division multiplexing (OFDM), direct-sequence spread spectrum (DSSS) communications, a combination of OFDM and DSSS communications, or other schemes. Implementations of the 802.11ah protocol or other sub-gigahertz protocols may be used for sensors, metering, and smart grid networks. Aspects of certain devices implementing such protocols may consume less power than devices implementing other wireless protocols. These devices may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations, or STAs). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point (AP) may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station "STA" may also comprise, be implemented as, or be known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 shows an exemplary wireless communication system. The wireless communication system 100 may operate pursuant to a wireless standard, for example the 802.11ah standard. The wireless communication system 100 may include an AP 104, which communicates with STAs such as a mobile phone 106a, a television 106b, a computer 106c, or another access point 106d (individually or collectively hereinafter identified by 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that are configured to use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
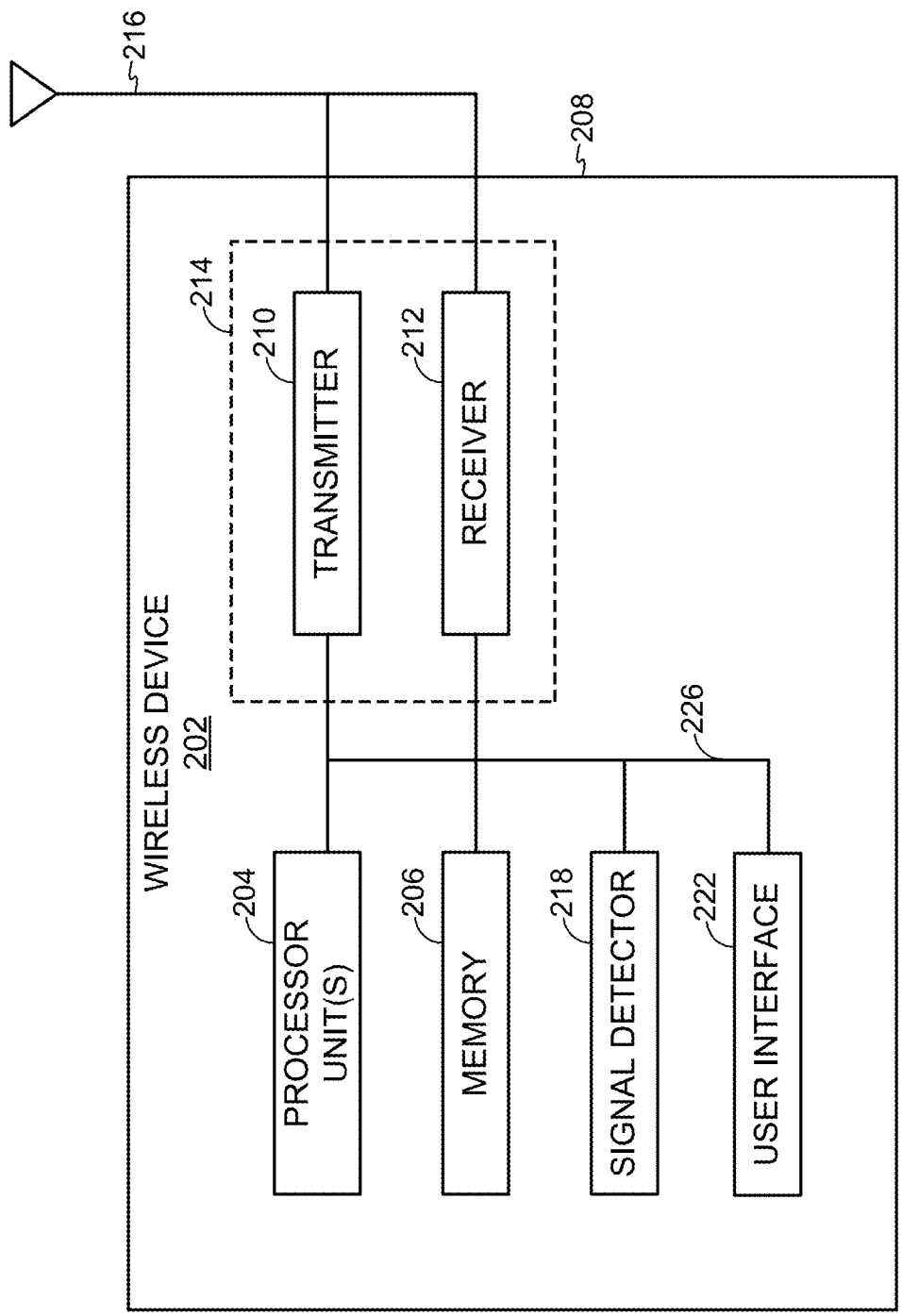
FIG. 2 shows a functional block diagram of an exemplary wireless device that may be employed within the wireless communication system of FIG. 1.

FIG. 2 shows a functional block diagram of an exemplary a wireless device that may be employed within the wireless communication system of FIG. 1. The wireless device 202 is an example of a device that may be configured to implement the various methods described herein. For example, the wireless device 202 may comprise the AP 104 or one of the STAs 106.

The wireless device 202 may include processor unit(s) 204 which control operation of the wireless device 202. One or more of the processor unit(s) 204 may be collectively referred to as a central processing unit (CPU). Memory 206, which may include both read-only memory (ROM) and random access memory (RAM), provides instructions and data to the processor units 204. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

When the wireless device 202 is implemented or used as a transmitting node, the processor unit(s) 204 may be configured to select one of a variety of transmission modes. For example, the processor unit(s) 204 may be configured to transmit data during a contention free period, as discussed in further detail below. The wireless device 202 may also be configured to temporarily disable transmitting while another wireless device transmits contention free. When the wireless device 202 is implemented or used as a receiving node, the processor unit(s) 204 may be configured to process received packets.

The processor unit(s) 206 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 comprise a DSP, the DSP may be configured to generate a packet for transmission. In some aspects, the packet may comprise a physical layer data unit (PPDU).

The wireless device 202 may also include machine-readable media for storing software. The processing unit(s) 204 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the wireless device 202 to perform the various functions described herein.

The wireless device 202 may include a transmitter 210 and/or a receiver 212 to allow transmission and reception, respectively, of data between the wireless device 202 and a remote location. The transmitter 210 and receiver 212 may be combined into a transceiver 214. An antenna 216 may be attached to the housing 208 and electrically coupled with the transceiver 214. The wireless device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets are made available to the transmitter 201. For example, the processor unit(s) 204 may store a packet in the memory 206 and the transmitter 201 may be configured to retrieve the packet. Once the transmitter retrieves the packet, the transmitter 201 transmits the packet to a STA 106 wireless device 202 via the antenna 216.

An antenna 216 on a STA 106 wireless device 202 detects the transmitted packets/signals. The STA 106 receiver 212 may be configured to process the detected packets/signals and make them available to the processor unit(s) 204. For example, the STA 106 receiver 212 may store the packet in memory 206 and the processor unit(s) 204 may be configured to retrieve the packet.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. The wireless device 202 may also include a housing 208 surrounding one or more of the components included in the wireless device 202.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3:
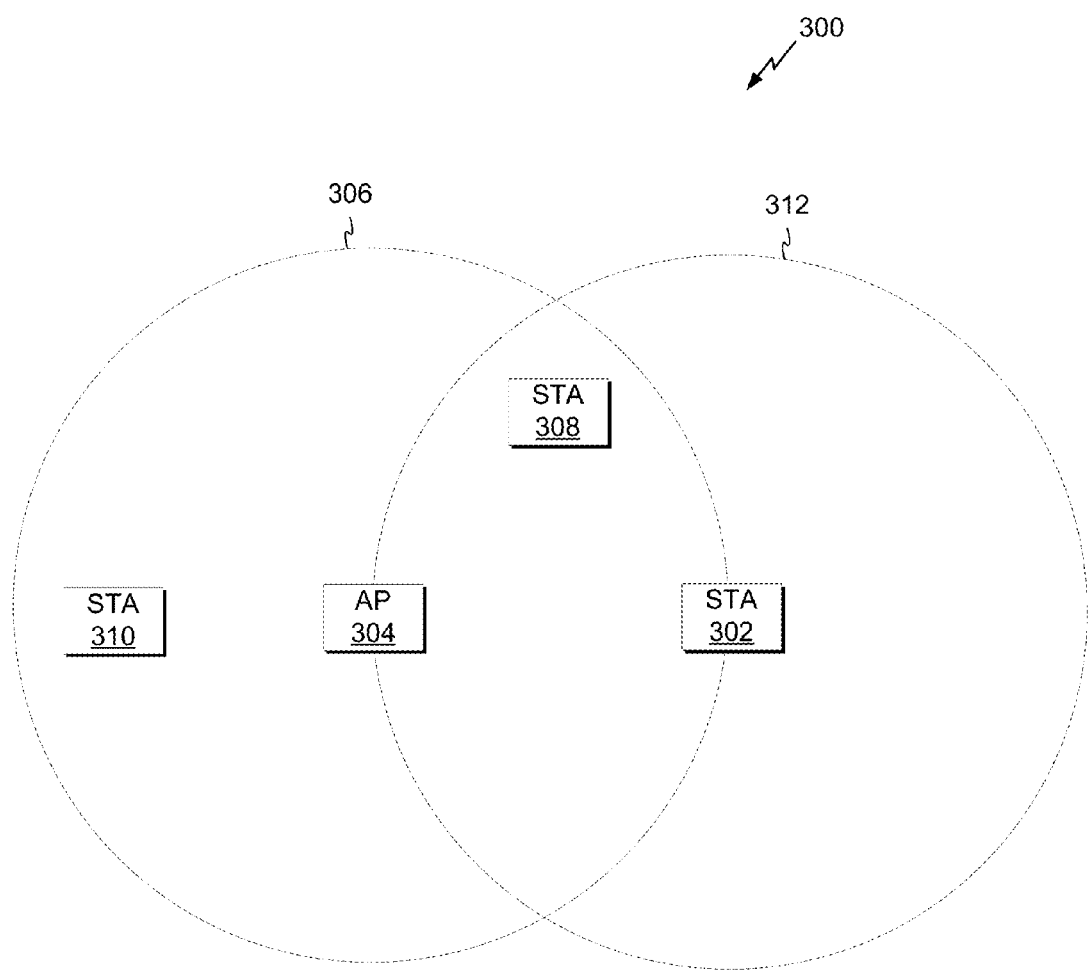
FIG. 3 shows a network coverage diagram for an exemplary wireless communication system.

FIG. 3 shows a network coverage diagram for an exemplary wireless communication system. Some communication systems provide a mechanism for STAs to request exclusive use of a network resource from an AP 304 within a BSA 306 provided by the AP 304. For example, a STA 302 may request a network allocation vector during which only the STA 302 will transmit data. Such a contention free period allows the STA 302 to transmit data while the other STAs in the BSA 306 of the AP 304, such as STA 308 and STA 310, pause transmitting data. The STA 302 may transmit a request to the AP 304 for exclusive use of the network resource. For example, in the 802.11 standard, a request to send message is transmitted. Other STAs within a BSA 312 of the STA 302, such as STA 308, may also receive this message. However, some STAs, such as STA 310, will be within the BSA 306 of the AP 304 servicing the request but not receive the request transmitted by the STA 302. Accordingly, STA 310 may not pause transmitting. This may generally be referred to as the "hidden node problem."

One solution to the hidden node problem is for the AP 304 to transmit a message indicating the start of a contention free period. For example in the 802.11 standard, a clear to send message is transmitted. Since the AP 304 will transmit this message to the STAs within the BSA 306 of the AP 304, such as STA 302, 308, and 310, upon receipt of the message from the AP 304, each STA 302, 308, and 310 will have been alerted to the contention free period.

The STAs 302, 308, and 310 may be configured to pause transmitting until they receive a signal indicating the end of the contention free period. In some implementations, the AP 304 may be configured to transmit the signal indicating the end of the contention free period. In some implementations, the STA 302 requesting the start of the contention free period transmits the signal indicating the end of the contention free period. In the case where the STA 302 transmits the signal, the same "hidden node problem" may arise. The STA 310 that does not receive the signal indicating the end of the contention free period will continue to wait for the end. Accordingly, the STA 310 may delay transmitting longer than necessary.

While the description generally refers to contention free period for data transmission, it will be appreciated that the methods and systems described herein may be used to manage other wireless network resources that may be allocated and later reset such as a network service (e.g., unique identifier generator) or data reception.

Figure 4:
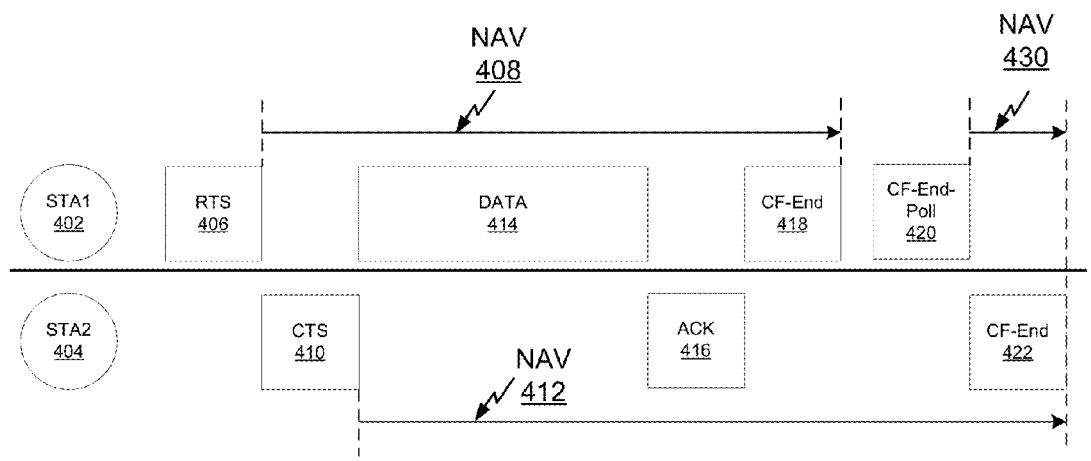
FIG. 4 shows a data flow diagram of an exemplary message exchange pattern that may be employed within the wireless communication system of FIG. 1.

FIG. 4 shows a data flow diagram of an exemplary message exchange pattern that may be employed within the wireless communication system of FIG. 1. The message exchange session shown in FIG. 4 is between two STAs, a data transmitting STA 402 and a peer STA 404. It will be appreciated, as discussed above, one or both of data transmitting STA 402 and peer STA 404 may be configured to operate as APs. Furthermore, it will be understood that the data transmitting STA 402 and the peer STA 404 may not be directly exchanging signals, but rather, in some implementations, the signals may be communicated via one or more intermediaries, such as an AP. Furthermore, STA 402 and peer STA 404 may not necessarily be communicating with each other, but rather may be configured to share the same AP. In one respect, a peer relationship may be characterized, at least in part, as devices sharing a common AP and/or BSA.

The data transmitting STA 402 begins the message exchange by transmitting a signal 406 requesting a contention free period 408. In some implementations, the signal 406 may be a request to send message in accordance with the 802.11 standard.

The peer STA 404 may transmit a signal 410 indicating the data transmitting STA 402 is clear to transmit data. In some implementations, the signal 410 may be a clear to send message in accordance with the 802.11 standard. Upon transmission of the signal 410, the peer STA 404 will initiate a contention free period 412 generally corresponding in duration with the contention free period 408.

The data transmitting STA 402 may then transmit a data signal 414. The data signal 414 may end with a symbol or series of symbols identifying the end of the data transmission. In some implementations, the data signal 414 is of a fixed length. The peer STA 404 may be configured to transmit an acknowledgement signal 416 responsive the data signal 414. For example, if STA 402 is transmitting data to peer STA 404 the acknowledgement signal 416 may be provided. Although FIG. 4 shows data signal 414 as a single signal and acknowledgement signal 416 as a single signal, in some implementations, data signal 414 comprises multiple data signals to be transmitted. In some implementations, the peer STA 404 may be configured to transmit an acknowledgement signal 416 for each data signal 414. In implementations where STA 402 is not transmitting data to peer STA 404, the acknowledgement signal 416 may be transmitted by a STA and/or an AP receiving the transmitted data from STA 402.

In some implementations, the data transmitting STA 402 may be configured to re-transmit the data signal 414 if the data transmitting STA 402 does not receive the acknowledgement signal 416. Having received the acknowledgement signal 416, the data transmitting STA 402 may conclude the data signal 414 was successfully transmitted. The data transmitting STA 402 may be configured to transmit a signal 418 ("CF-End" as shown in FIG. 4) indicating the end of the contention free period 408. Upon transmitting this signal 418 indicating the end of the contention free period 408, the contention free period 408 is said to have been reset. However, as shown in FIG. 4, the peer STA 404 may continue waiting to end the contention free period 412 because the peer STA 404 may not have received the signal 418 indicating the end of the contention free period 408.

The data transmitting STA 402 may be configured to transmit a signal 420 ("CF-End-Poll" as shown in FIG. 4) to another STA (not shown) causing the other STA to transmit a second signal 422 indicating the end of the contention free period 408. An example of this signal 420 is shown and described in further detail in reference to FIG. 6 below. In some implementations, the signal 420 may cause the other STA to poll for any STAs that have not reset and transmit a signal to these STAs. In some implementations, the other STA may be the AP providing network access to the data transmitting STA 402 and the peer STA 404. In some implementations, the other STA may be another peer STA or the peer STA 404. In some implementations, the signal 420 is transmitted after a short inter-frame space after the data transmitting STA 402 transmits signal 418. Accordingly, any "hidden nodes" will receive either signal 418 or second signal 422 indicating the end of the contention free period 408. This ensures that all STAs may be reset once the contention free period 408 is over.

The signal 420 indicating the end of the contention free period 408 may include various data elements. For example, the signal 420 may include a signal identifier such as a frame control field, to indicate the type of signal being transmitted. The signal 420 may include a duration which indicates how long the STA receiving the signal 420 should wait before transmitting the second signal 422 indicating the end of a contention free period 430. The signal 420 may include one or more STA identifiers. For example, the signal 420 may include an identifier for the data transmitting STA 402, an identifier for the peer STA 404, and an identifier for the AP. In some implementations, the identifier is a media access control (MAC) address. In some implementations, the identifier may identify all STAs (e.g., broadcast). The signal 420 may also include a checksum. The checksum may be used by a STA receiving the signal 420 to determine the integrity of the data included in the signal 420.

In some implementations, the signal 420 may use an existing signal format to transmit the included data. For example, in an 802.11 system, the CF-End message includes similar data as included in the signal 420. However, the receiver address in a standard CF-End message is generally set to "broadcast", that is, the message will be sent to all STAs. The signal 420 may instead identify a specific STA in the system. As discussed above, this may be the AP providing the network services or a peer STA such as peer STA 404. This allows legacy 802.11 systems to reset the network service using the techniques described herein along with existing signal formats.

Figure 5:
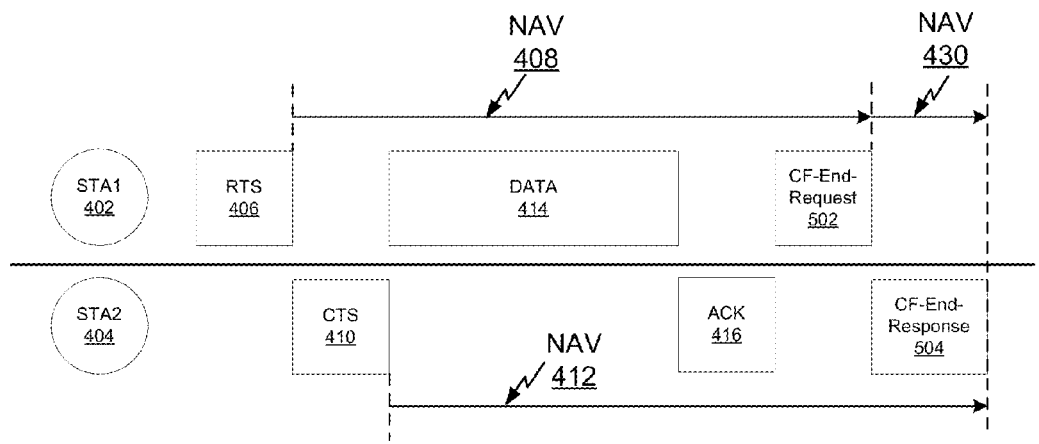
FIG. 5 shows a data flow diagram of another exemplary message exchange pattern that may be employed within the wireless communication system of FIG. 1.

FIG. 5 shows data flow diagram of another exemplary message exchange pattern that may be employed within the wireless communication system of FIG. 1. The message exchange pattern of FIG. 5 is similar to the message exchange pattern of FIG. 4. However, after receiving the acknowledgement signal 416, the data transmitting STA 402 will transmit a signal 502 ("CF-End-Request" as shown in FIG. 5) indicating the end of the contention free period and instructing another STA to transmit a signal 504 ("CF-End-Response" as shown in FIG. 5) indicating the end of the contention free period. The details of an example signal 502 and signal 504 are shown and described below in reference to FIGS. 7 and 8, respectively. Thus, signal 502 combines signal 418 and signal 420 of FIG. 4 into one signal, signal 502.

The signal 502 may include various data elements. In some implementations, the signal 502 may include a signal identifier such as a frame control field, to indicate the type of signal being transmitted. The signal 502 may include a duration 430 which indicates a duration until the end of a solicited contention free period end response period associated with signal 504. The signal 502 may include one or more STA identifiers. For example, the signal 502 may include an identifier for the data transmitting STA 402, an identifier for the peer STA 404, and an identifier for the access point providing the network service (not shown). In some implementations, the identifier is a MAC address. In some implementations, the identifier may identify all STAs (e.g., broadcast). The signal 502 may also include a checksum. The checksum may be used by a STA receiving the signal 502 to determine the integrity of the data included in the signal 502.

The signal 504 may include various data elements. In some implementations, the signal 504 may include a signal identifier such as a frame control field, to indicate the type of signal being transmitted. The signal 504 may include a duration which indicates a duration until the end of a solicited contention free period end response period associated with signal 504. In some implementations, such as that shown in FIG. 5, this may be configured to be zero thereby indicating that the contention free period ends upon receipt of the signal. The signal 504 may include one or more STA identifiers. For example, the signal 504 may include an identifier for the data transmitting STA 402 and an identifier for the access point providing the network service (not shown). In some implementations, the identifier is a MAC address. In some implementations, the identifier may identify all STAs (e.g., broadcast). For example, the identifier may be a pre-determined character representing signal broadcast (e.g., "*"). The signal 504 may also include a checksum. The checksum may be used by a STA receiving the signal 504 to determine the integrity of the data included in the signal 504.

Figure 6:
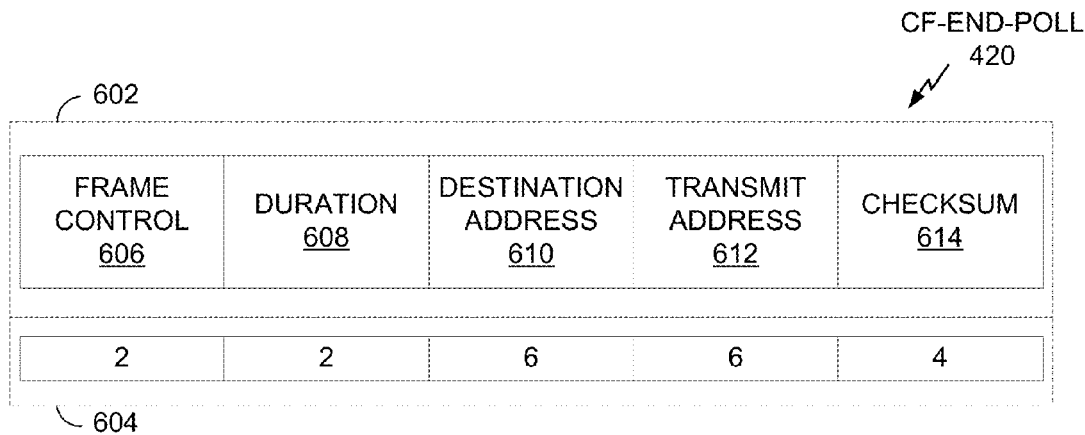
FIG. 6 shows an exemplary contention free end poll signal frame for use in the wireless communication systems described herein.

FIG. 6 shows an exemplary contention free end poll signal frame for use in the wireless communication systems described herein. The signal frame 420 shown in FIG. 6 includes a row 602 defining exemplary fields of the signal frame 420. It will be understood that the row 602 may include additional fields without departing from the scope of the disclosure. For example, the row 602 may also include security fields (e.g., encryption, signatures), auditing fields (e.g., timestamps), and the like.

The signal frame 420 shown in FIG. 6 also includes a row 604 defining exemplary byte lengths for the corresponding fields. It will be understood that the field lengths shown in row 604 may be different than those shown. It will be further understood that the field lengths shown may vary from signal to signal, network operator to network operator, or based on other characteristics of the wireless communication system.

The signal frame 420 includes a frame control field 606. As shown in FIG. 6, the frame control field is two bytes long. The frame control field 606 may include an indicator of the type of signal frame the signal frame 420 is. For example, a unique identifier corresponding to "contention free end poll" frames may be included in the frame control field 606.

The signal frame 420 includes a duration field 608. The duration field 608 shown in FIG. 6 is two bytes long. The duration field 608 may include a value indicating a duration of the contention free period. For example, the value may identify how long to wait to expect a contention free end response frame. The duration field 608 may include a value that represents a number of milliseconds to wait. In some implementation the duration field 608 may reference a generic value that may be used to determine the amount of time to wait. For example, the duration field 608 value may identify "category six" duration. The device receiving the frame may then determine the amount of time to wait for a "category six" frame such as look up via a mapping stored in memory, signaling with other elements of the wireless communication network, or the like.

The signal frame 420 may include a destination address field 610. The destination address field 610 may include a value indicating the destination device(s) for the signal frame 420. In the implementations shown in FIG. 6, the destination address field 610 is six bytes long. The destination address field 610 may include a value indicating the destination device(s) to receive the signal frame 420. In some implementations, the destination device may be a specifically addressed device such as via a media access control identifier associated with the destination device. In some implementations, the destination device may be specifically addressed using another unique identifier (e.g., BSSID, IMEI, MEID, or equivalents). In some implementations, the destination address field 610 may include a "broadcast" address which will cause multiple devices to receive the signal frame 420. The broadcast address may be a pre-determined character or series of characters.

The signal frame 420 may include a transmit address field 612. The transmit address field 612 shown in FIG. 6 is six bytes long. The transmit address field 612 may include a value indicating the device transmitting the signal frame 420. In some implementations, the transmit device may be a specifically addressed device such as via a media access control identifier associated with the transmitting device. In some implementations, the transmitting device may be specifically addressed using another unique identifier (e.g., BSSID, IMEI, MEID, or equivalents).

The signal frame 420 may also include a checksum field 614. As shown in FIG. 6, the checksum field 614 is four bytes long. The checksum field 614 may include a value that can be used to determine the integrity of the signal frame 420. For example, during transmission, a field or part of a field of the signal frame 420 may be lost. Based in part on a value included in the checksum field 614, a receiver can determine whether the signal frame 420 received was the same as the signal frame 420 transmitted.

Figure 7:
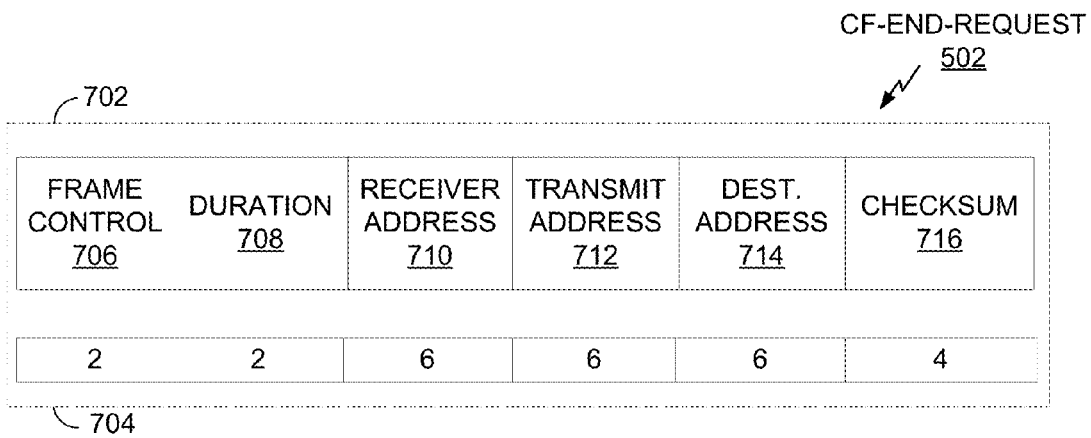
FIG. 7 shows an exemplary contention free end request signal frame for use in the wireless communication systems described herein.

FIG. 7 shows an exemplary contention free end request signal frame for use in the wireless communication systems described herein. The signal frame 502 shown in FIG. 7 includes a row 702 illustrating exemplary fields included in the signal frame 502. It will be understood that the row 702 may include additional fields without departing from the scope of the disclosure. For example, the row 702 may include security fields (e.g., encryption, signatures), auditing fields (e.g., timestamps), and the like.

The signal frame 502 shown in FIG. 7 also includes a row 704 illustrating exemplary byte lengths for the corresponding fields included in the signal frame 502. It will be understood that the field lengths shown in row 704 may be different than those shown. It will be further understood that the field lengths shown may vary from signal to signal, network operator to network operator, or based on other characteristics of the wireless communication system.

The signal frame 502 may include frame control field 706. The frame control field 706 may be similar to the frame control field 606 described in FIG. 6 above. However, the value included in the frame control field 706 may be a value identifying the signal frame 502 as a contention free end request signal frame.

The signal frame 502 may include a duration field 708 which is substantially similar to the duration field 608 described in FIG. 6 above. The duration field 708 shown in FIG. 7 is two bytes long. The duration field 708 may include a value indicating the amount of time until the end of the solicited contention free end response signal is to be received.

The signal frame 502 may include a receiver address field 710. The receiver address field 710 shown in FIG. 7 is six bytes long. The receiver address field 710 may include a value indicating the device(s) that should send contention free end signals. For example, the receiver address field 710 may indicate peer STAs that should be used to transmit contention free end signals. In some implementations, the value of the receiver address field 710 may also identify APs. The value may be a specific identifier for a specific device (e.g., MAC address, BSSID, IMEI, MEID, or equivalents). In some implementations, the value may indicate a "broadcast" address which will cause multiple devices to receive the signal frame 420. The broadcast address may be a pre-determined character or series of characters.

The signal frame 502 may include a transmit address field 712. The transmit address field 712 shown in FIG. 7 is six bytes long. The transmit address field 712 may include a value indicating the device transmitting the signal frame 502. In some implementations, the transmitting device may be a specifically addressed device such as via a media access control identifier associated with the transmitting device. In some implementations, the transmitting device may be specifically addressed using another unique identifier (e.g., BSSID, IMEI, MEID, or equivalents).

The signal frame 502 may include a destination address field 714. The destination address field 714 shown in FIG. 7 is six bytes long. The destination address field 714 may include a value indicating the device(s) that should receive a contention free end signal. The receivers identified in the receiver address field 710 may determine which devices should receive the contention free end signal based on the devices identified in the destination address field 714. As discussed above, the destination address field 714 may uniquely identify a specific device to receive the contention free end signal or may include a "broadcast" identifier.

The signal frame 502 may include a checksum field 716 which is substantially similar to the checksum field 614 described in FIG. 6 above. The checksum field 716 shown in FIG. 7 is four bytes long.

Figure 8:
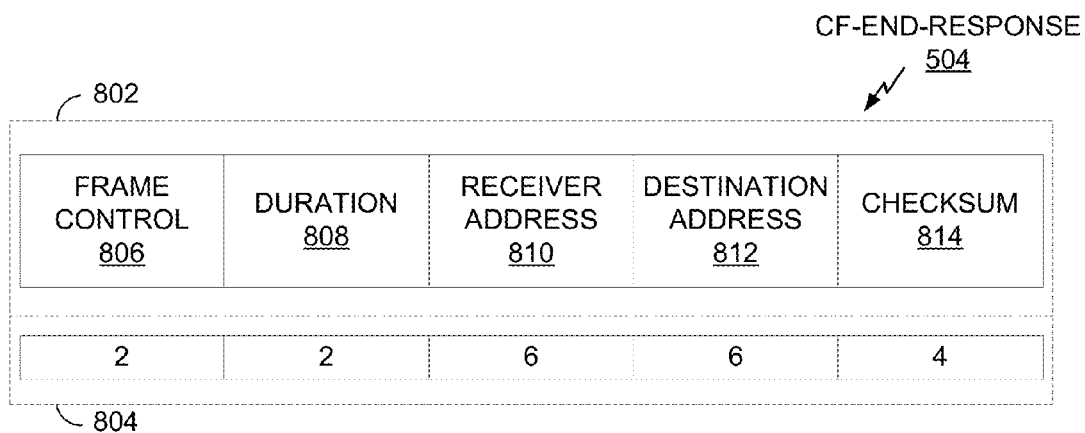
FIG. 8 shows an exemplary contention free end response signal frame for use in the wireless communication systems described herein.

FIG. 8 shows an exemplary contention free end response signal frame for use in the wireless communication systems described herein. The signal frame 504 shown in FIG. 8 includes a row 802 illustrating exemplary fields included in the signal frame 504. It will be understood that the row 802 may include additional fields without departing from the scope of the disclosure. For example, the row 802 may include security fields (e.g., encryption, signatures), auditing fields (e.g., timestamps), and the like.

The signal frame 504 shown in FIG. 8 also includes a row 804 illustrating exemplary byte lengths for the corresponding fields included in the signal frame 504. It will be understood that the field lengths shown in row 804 may be different than those shown. It will be further understood that the field lengths shown may vary from signal to signal, network operator to network operator, or based on other characteristics of the wireless communication system.

The signal frame 504 may include frame control field 806. The frame control field 806 may be similar to the frame control field 606 described in FIG. 6 above. However, the value included in the frame control field 806 may be a value identifying the signal frame 504 as a contention free end response signal frame.

The signal frame 504 may include a duration field 808 which is substantially similar to the duration field 608 described in FIG. 6 above. The duration field 808 shown in FIG. 8 is two bytes long. The duration field 808 may include a value indicating the amount of time until the end of the solicited contention free end response signal is to be received. In some implementations, the duration field 808 may include a value of zero.

The signal frame 504 may include a receiver address field 810. The receiver address field 810 may include a value indicating the device(s) which requested the contention free end response signal frame 504. In some implementations, the value of the receiver address field 810 included in the contention free end response signal frame 504 may be the same as the value included in the signal frame 502 receiver address field 710. As shown in FIG. 8, the receiver address field 810 is six bytes long. As discussed above, the receiver address field 810 may uniquely identify a specific device requesting the contention free end response signal frame 504 (e.g., using MAC address, BSSID, IMEI, MEID, or equivalents) or may include a "broadcast" identifier.

The signal frame 504 may include a destination address 812. The destination address 512 may identify the device transmitting the contention free end response signal frame 504. Where a contention free end request signal frame 502 is transmitted with a specific value in the destination address field 714, the value of the destination address field 812 for the corresponding contention free end response signal frame 504 may include the same value. As shown in FIG. 8, the destination address field 812 is six bytes long. The value included in the destination address field 812 may be a specific identifier for a specific device (e.g., MAC address, BSSID, IMEI, MEID, or equivalents).

The signal frame 504 may include a checksum field 814 which is substantially similar to the checksum field 614 described in FIG. 6. The checksum field 814 shown in FIG. 8 is four bytes long.

Figure 9:
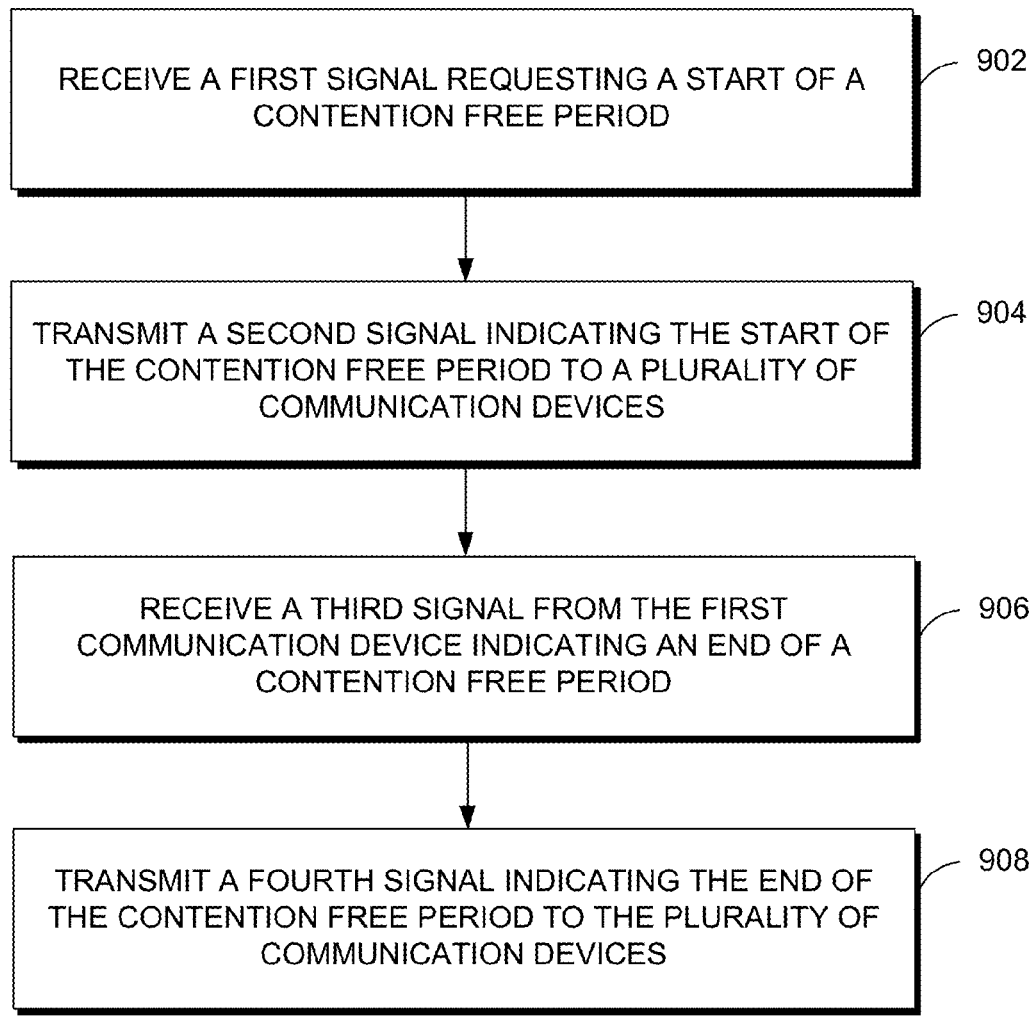
FIG. 9 shows a flowchart for an exemplary method of transmitting reset signals within the wireless communication system of FIG. 1.

FIG. 9 shows a flowchart for an exemplary method of transmitting reset signals within the wireless communication system of FIG. 1. In some implementations, this method may be performed by a peer STA. For example, the wireless device 202 of FIG. 2 may be configured to perform one or more aspects of the method shown in FIG. 9.

The method begins at block 902 by receiving a first signal requesting the start of a contention free period for a first communication device. In some implementations, the signal is received from an access point. At block 904 a second signal indicating the start of the contention free period is transmitted to a plurality of communication devices. At block 906 the process continues by receiving a third signal indicating an end of a contention free period. For example, the third signal may be the signal 420 or the signal 502 described above. At block 608, a fourth signal is transmitted indicating the end of the contention free period to the plurality of communication devices. For instance, the fourth signal may be the second signal 422 or the signal 504 described above.

Figure 10:
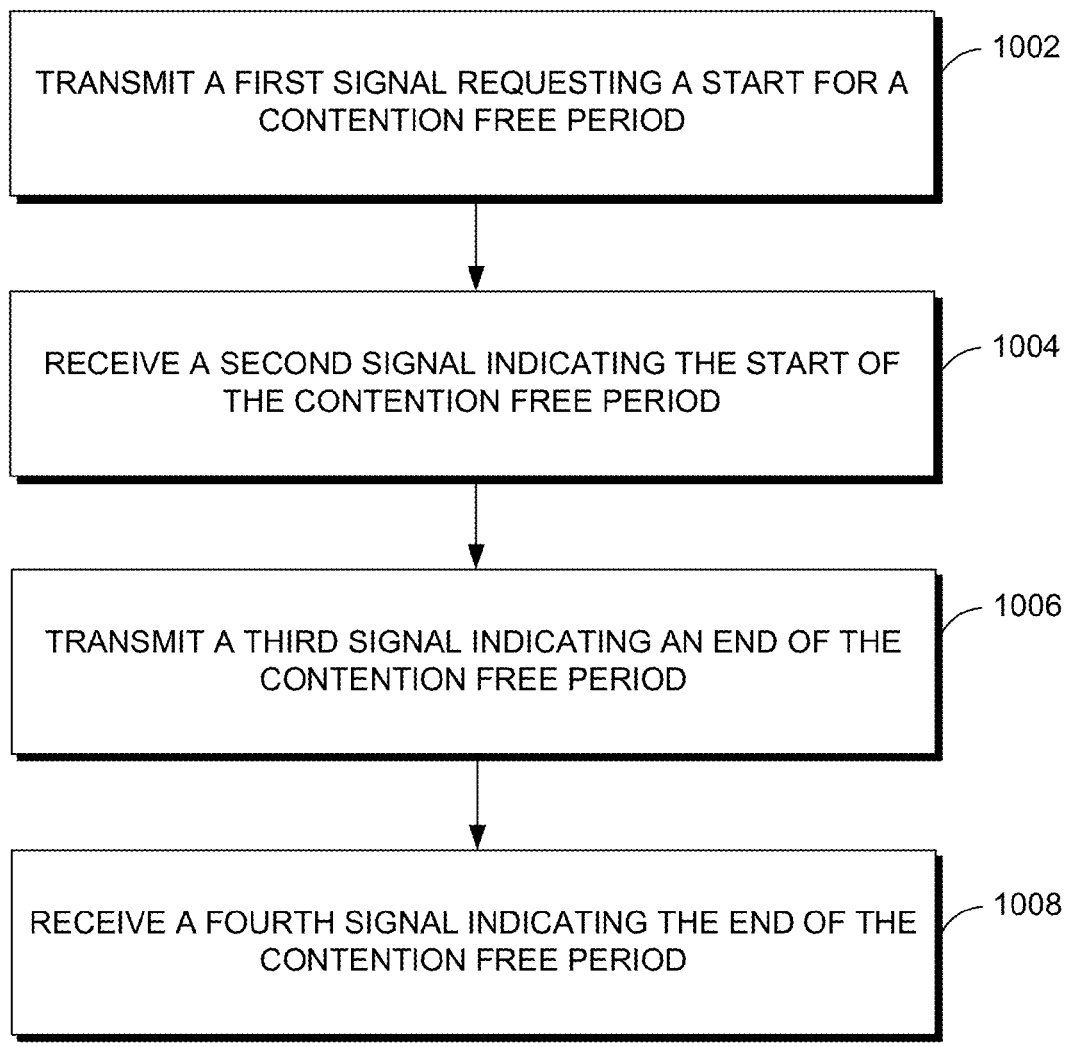
FIG. 10 shows a flowchart for an exemplary method of receiving reset signals within the wireless communication system of FIG. 1.

FIG. 10 shows a flowchart for an exemplary method of receiving reset signals within the wireless communication system of FIG. 1. In some implementations, this method may be performed by a data transmitting STA within the BSA of an AP requesting the contention free period. For example, the wireless device 202 of FIG. 2 may be configured to perform one or more aspects of the method shown in FIG. 10.

The method begins at block 1002 by transmitting a first signal requesting the start for a contention free period. The method continues at block 1004 where a second signal indicating the start of the contention free period is received. The flow proceeds to block 1006 where a third signal is transmitted indicating an end of a contention free period. For example, the signal may be the signal 420 or the signal 502 described above. At block 1008, a fourth signal indicating the end of the contention free period is received from the first communication device. For instance, the second signal may be the second signal 422 or the signal 504 described above.

Figure 11:
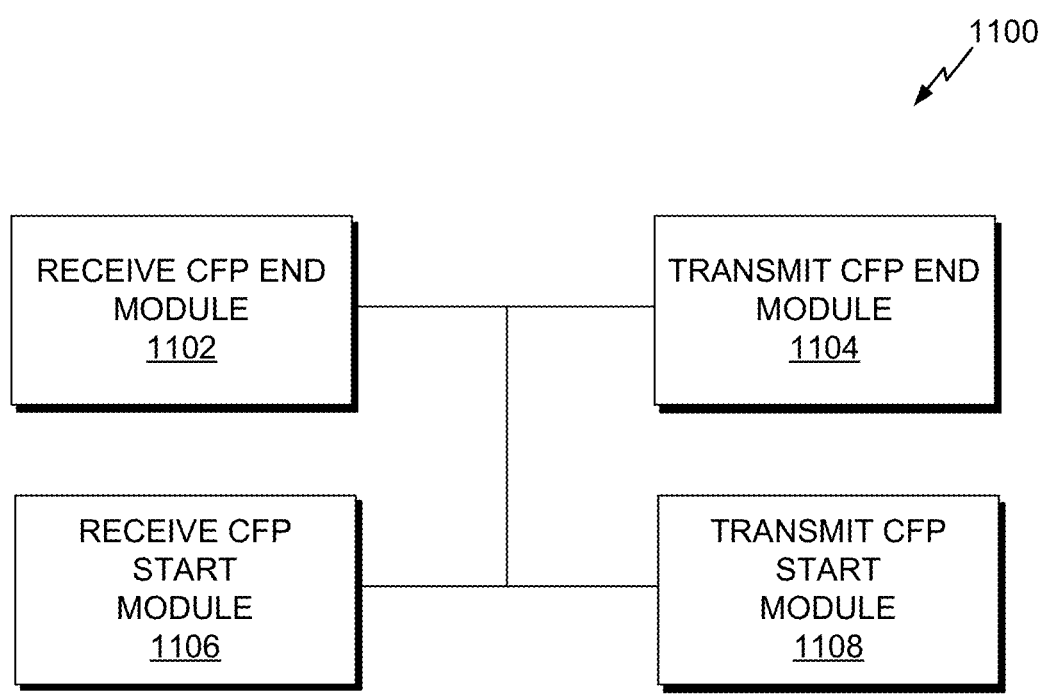
FIG. 11 shows a functional block diagram of another exemplary wireless device that may be employed within the wireless communication system of FIG. 1.

FIG. 11 shows a functional block diagram of another exemplary wireless device that may be employed within the wireless communication system of FIG. 1. The wireless device 1100 includes a means for transmitting a contention free end signal 1104. The means for transmitting a contention free end signal 1104 may include an antenna, a processor, an encoder, a power source and the like. The wireless device 1100 includes means for receiving a contention free end signal 1102. The means for receiving a contention free end signal 1102 may include an antenna, a processor, a decoder, and the like.

The wireless device includes means for transmitting a contention free start signal 1108. The means for transmitting a contention free start signal 1108 may include an antenna, a processor, an encoder, a power source, and the like. The wireless device 1100 includes means for receiving a contention free start signal 1106. The means for receiving a contention free start signal 1106 may include an antenna, a processor, a decoder, and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless communication system comprising:
   receiving, from an access point, a first signal requesting a start of a contention free period for a first communication device;
   after the first signal is received, transmitting, to a plurality of communication devices, a second signal including an indication of the start of the contention free period;
   receiving, from the access point, a data signal in response to transmitting the indication of the start of the contention free period;
   transmitting, to the access point, an acknowledgement signal in response to receiving the data signal;
   receiving, from the access point, a third signal in response to transmitting the acknowledgement signal, the third signal including an indication of an end of the contention free period and including a duration indicating an amount of time to wait before transmitting a fourth signal; and
   after the indication of the end of the contention free period is received, transmitting the fourth signal including the indication of the end of the contention free period to the plurality of communication devices based on the received third signal and the duration.

2. The method of claim 1, wherein the second signal, a data signal, and the fourth signal are transmitted during the contention free period requested by the first signal.

3. The method of claim 1, wherein the third signal is received during the contention free period requested by the first signal, and wherein the second signal, a data signal, and the fourth signal are transmitted during the contention free period requested by the first signal.

4. The method of claim 1, wherein the first communication device comprises a user equipment.

5. The method of claim 1, wherein receiving the third signal comprises receiving a third signal at a user equipment.

6. The method of claim 5, wherein the user equipment is a peer of the first communication device.

7. The method of claim 1, wherein transmitting the fourth signal comprises transmitting the fourth signal from a user equipment.

8. The method of claim 1, wherein receiving the third signal comprises receiving a signal including a signal identifier, a first value identifying a communication device transmitting the third signal, a second value identifying a second communication device of the plurality of communication devices to receive the third signal and to transmit the fourth signal, a duration indicating an amount of time to wait for a response at the second communication device after transmitting the fourth signal, and a signal checksum.

9. The method of claim 8, wherein at least one of the first value identifying the device transmitting the third signal and the second value identifying the second communication device of the plurality of communication devices comprises a media access control address.

10. The method of claim 1, wherein receiving the third signal comprises receiving a signal including a signal identifier, a first value identifying a communication device of the plurality of communication devices transmitting the third signal, a second value identifying a second communication device of the plurality of communication devices to receive the third signal and to transmit the fourth signal, a third value identifying one or more communication devices of the plurality of communication devices the second communication device will transmit the fourth signal to, a duration indicating an amount of time to wait to receive a response from a communication device of the one or more communications devices identified by the third signal after transmitting the fourth signal, and a signal checksum.

11. The method of claim 10, wherein at least one of the first value identifying a communication device, the second value identifying a second communication device of the plurality of communication devices, and the third value identifying one or more communication devices of the plurality of communication devices comprises a media access control address.

12. A method of communicating in a wireless communication system comprising:
    transmitting, from an access point, a first signal requesting a start of a contention free period;
    after the first signal is transmitted, receiving a second signal including an indication of the start of the contention free period;
    transmitting, from the access point, a data signal in response to receiving the indication of the start of the contention free period;
    receiving, at the access point, an acknowledgement signal in response to transmitting the data signal;
    transmitting, from the access point, a third signal in response to receiving the acknowledgement signal, the third signal including an indication of an end of the contention free period and including a duration indicating an amount of time to wait before transmitting a fourth signal; and
    after the indication of the end of the contention free period is transmitted, receiving, based at least in part on the duration, a fourth signal including the indication of the end of the contention free period including information from the transmitted third signal.

13. The method of claim 12, wherein transmitting the third signal comprises transmitting a signal including a signal identifier, a first value identifying the access point transmitting the third signal, a second value identifying a second communication device of the plurality of communication devices to receive the third signal and to transmit the fourth signal, a duration indicating an amount of time to wait for a response at the second communication device after transmitting the fourth signal, and a signal checksum.

14. The method of claim 13, wherein at least one of the first value identifying the access point and the second value identifying the second communication device of the plurality of communication devices comprises a media access control address.

15. The method of claim 12, wherein transmitting the third signal comprises transmitting a signal including a signal identifier, a first value identifying the access point, a second value identifying a second communication device of the plurality of communication devices to receive the third signal and to transmit the fourth signal, a third value identifying one or more communication devices of the plurality of communication devices the second communication device will transmit the fourth signal to, a duration indicating an amount of time to wait to receive a response from a communication device of the one or more communications devices identified by the third signal after transmitting the fourth signal, and a signal checksum.

16. The method of claim 15, wherein at least one of the first value identifying the access point, the second value identifying a second communication device of the plurality of communication devices, and the third value identifying one or more communication devices of the plurality of communication devices comprises a media access control address.

17. The method of claim 12, wherein transmitting the third signal comprises transmitting the third signal to a user equipment.

18. A wireless communication device comprising:
- a receiver configured to receive an indication of a contention free period end for a contention free period from a device having requested the contention free period, the indication of the contention free period end being received in response to transmitting an acknowledgement signal in response to receiving a data signal, the data signal received in response to transmitting an indication of a start of the contention free period;
- a processor configured to generate a first signal including a duration, the first signal instructing a second wireless communication device to transmit a signal after the transmission of the first signal, the signal including an indication of the end of the contention free period based on the first signal and the duration, the duration indicating an amount of time to wait before transmitting the indication of the end of the contention free period; and
- a transmitter coupled with the processor and configured to transmit the first signal to the second wireless communication device.

19. The wireless communication device of claim 18, wherein the second wireless communication device comprises a user equipment.

20. The wireless communication device of claim 18, wherein the first signal comprises:
- a signal identifier;
- a duration indicator specifying an amount of time to wait for a response at the second wireless communication device after transmitting the signal indicating the end of the contention free period;
- a first address specifying a value identifying the second wireless communication device;
- a second address specifying a value identifying the wireless communication device; and
- a signal checksum.

21. The wireless communication device of claim 20, wherein at least one of the value identifying the wireless communication device and the value identifying the second wireless communication device comprises a media access control address.

22. The wireless communication device of claim 18, wherein the first signal comprises:
- a signal identifier;
- a duration indicator specifying an amount of time to wait for a response at the second wireless communication device after transmitting the signal indicating the end of the contention free period;
- a first address specifying a value identifying the second wireless communication device;
- a second address specifying a value identifying the wireless communication device;
- a third address specifying a value identifying one or more wireless communication devices the second communication device will transmit the signal indicating the end of the contention free period; and
- a signal checksum.

23. The wireless communication device of claim 22, wherein at least one of the value identifying the wireless communication device, the value identifying the second wireless communication device, and the value identifying the one or more wireless communication devices comprises a media access control address.

24. The wireless communication device of claim 18, further comprising a receiver configured to receive the signal indicating the end of the contention free period.

25. The wireless communication device of claim 24, wherein the signal indicating the end of the contention free period comprises:
- a signal identifier;
- a duration indicator specifying an amount of time for a receiving device to transmit a response to the signal indicating the end of the contention free period;
- a first address specifying a value identifying a wireless communication device to receive the response to the signal indicating the end of the contention free period;
- a second address specifying a value identifying the wireless communication device; and
- a signal checksum.

26. The wireless communication device of claim 25, wherein at least one of the value identifying the wireless communication device and the value identifying the wireless communication device to receive the response comprises a media access control address.

27. A wireless communication device comprising:
- a receiver configured to:
  - receive an initial contention free period end signal for a contention free period, the initial contention free period end signal being received in response to transmitting an acknowledgement signal in response to receiving a data signal, the data signal received in response to transmitting an indication of a start of the contention free period, and
  - receive a first signal from a second wireless communication device including an indication of an end of the contention free period and including a duration indication an amount of time to wait before transmitting a second signal, the initial contention free period end signal received at a first point in time preceding a second point in time when the indication of the end of the contention free period is received;
- a processor coupled with the receiver and configured to generate the second signal, the second signal including the indication of the end of the contention free period and being based at least in part on the indication of the end of the contention free period and the duration indication; and
- a transmitter coupled with the processor and configured to transmit the second signal, after the transmission of the indication of the end of the contention free period, to a plurality of wireless communication devices based at least in part on the first signal and the duration.

28. The wireless communication device of claim 27, wherein the first signal comprises:
- a signal identifier;
- a duration indicator specifying an amount of time to wait for a response from the plurality of wireless communication devices after transmitting the second signal indicating the end of the contention free period;
- a first address specifying a value identifying the second wireless communication device;
- a second address specifying a value identifying the wireless communication device; and
- a signal checksum.

29. The wireless communication device of claim 28, wherein at least one of the value identifying the wireless communication device and the value identifying the second wireless communication device comprises a media access control address.

30. The wireless communication device of claim 27, wherein the first signal comprises:
- a signal identifier;
- a duration indicator specifying an amount of time to wait for a response from the plurality of wireless communication devices after transmitting the signal indicating the end of the contention free period;
- a first address specifying a value identifying the second wireless communication device;
- a second address specifying a value identifying the wireless communication device;
- a third address specifying a value identifying one or more of the plurality of wireless communication devices to receive the second signal indicating; and
- a signal checksum.

31. The wireless communication device of claim 30, wherein at least one of the value identifying the wireless communication device, the value identifying the second wireless communication device, and the value identifying the third wireless communication device comprises a media access control address.

32. The wireless communication device of claim 27, wherein the second wireless communication device comprises a user equipment.

33. The wireless communication device of claim 32, wherein the wireless communication device and the second wireless communication device are peers.

34. The wireless communication device of claim 27, wherein the wireless communication device comprises a user equipment.

35. A non-transitory computer readable storage medium comprising instructions that, when executed by a processor of a wireless communication apparatus, cause the wireless communication apparatus to:
- receive, from an access point, a first signal requesting a start of a contention free period for a first communication device;
- after the first signal is received, transmit, to a plurality of communication devices, a second signal including an indication of the start of the contention free period;
- receive, from the access point, a data signal in response to transmitting the indication of the start of the contention free period;
- transmit, to the access point, an acknowledgement signal in response to receiving the data signal;
- receive, from the access point, a third signal in response to transmitting the acknowledgement signal, the third signal including an indication of an end of the contention free period and including a duration indicating an amount of time to wait before transmitting a fourth signal; and
- after the indication of the end of the contention free period is received, transmit the fourth signal including the indication of the end of the contention free period to the plurality of communication devices based on the received third signal and the duration.

36. The non-transitory computer readable storage medium of claim 35, wherein the second signal, a data signal, and the fourth signal are transmitted to the plurality of communication devices during the contention free period requested by the first signal.

37. The non-transitory computer readable storage medium of claim 35, wherein the third signal is received during the contention free period requested by the first signal, and wherein the second signal, a data signal, and the fourth signal are transmitted during the contention free period requested by the first signal.

38. The non-transitory computer readable storage medium of claim 35, wherein the first communication device comprises a user equipment.

39. The non-transitory computer readable storage medium of claim 35, wherein receiving the third signal comprises receiving the signal at a user equipment.

40. The non-transitory computer readable storage medium of claim 39, wherein the user equipment is a peer of the first communication device.

41. The non-transitory computer readable storage medium of claim 35, wherein transmitting the fourth signal comprises transmitting the fourth signal from a user equipment.

42. The non-transitory computer readable storage medium of claim 35, wherein receiving the third signal comprises receiving a signal including a signal identifier, a first value identifying a communication device transmitting the third signal, a second value identifying a second communication device of the plurality of communication devices to receive the third signal and to transmit the fourth signal, a duration indicating an amount of time to wait for a response at the second communication device after transmitting the fourth signal, and a signal checksum.

43. The non-transitory computer readable storage medium of claim 42, wherein at least one of the first value identifying the device transmitting the third signal and the second value identifying the second communication device of the plurality of communication devices comprises at least one of a media access control address, a mobile equipment identifier, an international mobile equipment identity value, or a basic service set identifier.

44. The non-transitory computer readable storage medium of claim 35, wherein receiving the third signal comprises receiving a signal including a signal identifier, a first value a communication device of the plurality of communication devices transmitting the third signal, a second value identifying a second communication device of the plurality of communication devices to receive the third signal and transmit the fourth signal, a third value identifying one or more communication devices of the plurality of communication devices the second communication device will transmit the fourth signal to, a duration indicating an amount of time the second communication device will wait to receive a response from a communication device of the one or more communications devices identified by the third signal after transmitting the fourth signal, and a signal checksum.

45. The non-transitory computer readable storage medium of claim 44, wherein at least one of the first value identifying a communication device, the second value identifying the second communication device of the plurality of communication devices, and the third value identifying one or more communication devices of the plurality of communication devices comprises a media access control address.

46. A non-transitory computer readable storage medium comprising instructions that, when executed by a processor of a wireless communication apparatus, cause the wireless communication apparatus to:
- transmit, from an access point, a first signal requesting a start of a contention free period;
- after the first signal is transmitted, receive a second signal including an indication of the start of the contention free period;

transmit, from the access point, a data signal in response to receiving the indication of the start of the contention free period;

receive, at the access point, an acknowledgement signal in response to transmitting the data signal;

transmit, from the access point, a third signal in response to receiving the acknowledgement signal, the third signal including an indication of an end of the contention free period and including a duration indicating an amount of time to wait before transmitting a fourth signal; and after the indication of the end of the contention free period is transmitted, receive, based at least in part on the duration, a fourth signal including the indication of the end of the contention free period.

47. The non-transitory computer readable storage medium of claim 46, wherein transmitting the third signal comprises transmitting a signal including a signal identifier, a first value identifying the access point transmitting the third signal, a second value identifying a second communication device of the plurality of communication devices to receive third signal and to transmit the fourth signal, a duration indicating an amount of time to wait for a response at the second communication device after transmitting the fourth signal, and a signal checksum.

48. The non-transitory computer readable storage medium of claim 47, wherein at least one of the first value identifying the access point and the second value identifying the second communication device of the plurality of communication devices comprises a media access control address.

49. The non-transitory computer readable storage medium of claim 46, wherein transmitting the third signal comprises transmitting a signal including a signal identifier, a first value identifying the access point a second value identifying a second communication device of the plurality of communication devices to receive the third signal and to transmit the fourth signal, a third value identifying one or more communication devices of the plurality of communication devices the second communication device will transmit the fourth signal to, a duration indicating an amount of time to wait to receive a response from a communication device of the one or more communications devices identified by the third signal after transmitting the fourth signal, and a signal checksum.

50. The non-transitory computer readable storage medium of claim 49, wherein at least one of the first value identifying the access point, the second value identifying a second communication device of the plurality of communication devices, and the third value identifying one or more communication devices of the plurality of communication devices comprises a media access control address.

51. The non-transitory computer readable storage medium of claim 46, wherein the apparatus comprises a user equipment.

52. The non-transitory computer readable storage medium of claim 46, wherein transmitting the first signal comprises transmitting the first signal to another access point.

53. The non-transitory computer readable storage medium of claim 46, wherein transmitting the third signal comprises transmitting the third signal to a user equipment.

54. A wireless communication device comprising:
means for receiving, from an access point, a first signal requesting the start of a contention free period for a first communication device;

after the first signal is received, means for transmitting a second signal including an indication of the start of the contention free period to a plurality of communication devices;

means for receiving, from the access point, a data signal in response to transmitting the indication of the start of the contention free period;

means for transmitting, to the access point, an acknowledgement signal in response to receiving the data signal;

means for receiving, from the access point, a third signal in response to transmitting the acknowledgement signal, the third signal including an indication of an end of the contention free period and including a duration indicating an amount of time to wait before transmitting a fourth signal; and after the indication of the end of the contention free period is received, means for transmitting the fourth signal including the indication of the end of the contention free period to the plurality of communication devices based on the received third signal and the duration.

55. The wireless communication device of claim 54, wherein the means for receiving the third signal comprises means for receiving a signal including a signal identifier, a first value identifying a communication device transmitting the third signal, a second value identifying the wireless communication device, a duration indicating an amount of time to wait for a response at the wireless communication device after transmitting the fourth signal, and a signal checksum.

56. The wireless communication device of claim 55, wherein at least one of the first value identifying the communication device transmitting the third signal and the second value identifying the wireless communication device comprises a media access control address.

57. The wireless communication device of claim 54, wherein the means for receiving the third signal comprises means for receiving a signal including a signal identifier, a first value identifying a communication device of the plurality of communication devices transmitting the third signal, a second value identifying the wireless communication device, a third value identifying one or more communication devices of the plurality of communication devices the wireless communication device will transmit the fourth signal to, a duration indicating an amount of time to wait for a response at the wireless communication device after transmitting the fourth signal, and a signal checksum.

58. The wireless communication device of claim 57, wherein at least one of the first value identifying a communication device, the second value identifying the wireless communication device, and the third value identifying one or more communication devices of the plurality of communication devices comprises a media access control address.

59. A wireless communication device comprising:
means for transmitting, from an access point, a first signal requesting the start of a contention free period for a first communication device;

after the first signal is transmitted, means for receiving a second signal including an indication of the start of the contention free period;

means for transmitting, from the access point, a data signal in response to receiving the indication of the start of the contention free period;

means for receiving, at the access point, an acknowledgement signal in response to transmitting the data signal;

means for transmitting, from the access point, a third signal in response to receiving the acknowledgement signal, the third signal including an indication of an end of the contention free period and including a duration indicating an amount of time to wait before transmitting a fourth signal; and after the indication of the end of the contention free period is transmitted, means for receiving, based at least in part on the duration, a fourth signal including the indication of the end of the contention free period including information from the transmitted third signal.

60. The wireless communication device of claim 59, wherein the means for transmitting the third signal comprises means for transmitting a signal including a signal identifier, a first value identifying the access point transmitting the third signal, a second value identifying a second communication device of the plurality of communication devices to receive the third signal and to transmit the fourth signal, a duration indicating an amount of time to wait for a response at the second communication device after transmitting the fourth signal, and a signal checksum.

61. The wireless communication device of claim 60, wherein at least one of the first value identifying the access point transmitting the third signal and the second value identifying the second communication device of the plurality of communication devices comprises a media access control address.

* * * * *